United States Patent
Zhang et al.

(10) Patent No.: US 8,432,984 B2
(45) Date of Patent: Apr. 30, 2013

(54) ADAPTIVE SCHEME TO DETERMINE THE SUB-CARRIER SPACING FOR MULTI-CARRIER SYSTEMS

(75) Inventors: Xiaobo Zhang, Shanghai (CN); Ni Ma, Shanghai (CN)

(73) Assignee: NXP B.V., Eindhoven (NL)

( * ) Notice: Subject to any disclaimer, the term of this patent is extended or adjusted under 35 U.S.C. 154(b) by 190 days.

(21) Appl. No.: 13/057,451

(22) PCT Filed: Aug. 4, 2008

(86) PCT No.: PCT/CN2008/001420
§ 371 (c)(1),
(2), (4) Date: Feb. 3, 2011

(87) PCT Pub. No.: WO2010/015102
PCT Pub. Date: Feb. 11, 2010

(65) Prior Publication Data
US 2011/0142151 A1   Jun. 16, 2011

(30) Foreign Application Priority Data

Aug. 4, 2008  (WO) ............... PCT/CN2008/001420

(51) Int. Cl.
*H04K 1/10* (2006.01)
*H04L 27/28* (2006.01)

(52) U.S. Cl.
USPC .......................................... 375/260; 375/259

(58) Field of Classification Search ................. 375/260
See application file for complete search history.

(56) References Cited

U.S. PATENT DOCUMENTS

| | | | |
|---|---|---|---|
| 7,751,509 B1 * | 7/2010 | Lehnert | 375/346 |
| 2007/0155387 A1 | 7/2007 | Li et al. | |
| 2008/0130485 A1 * | 6/2008 | Yang | 370/208 |
| 2008/0240275 A1 | 10/2008 | Cai | |
| 2009/0092090 A1 * | 4/2009 | Beems Hart et al. | 370/329 |
| 2009/0122771 A1 * | 5/2009 | Cai | 370/338 |
| 2012/0188946 A1 * | 7/2012 | Ma et al. | 370/328 |

FOREIGN PATENT DOCUMENTS

| | | |
|---|---|---|
| CN | 1606298 A | 4/2005 |
| CN | 101136894 A | 3/2008 |
| CN | 101272371 A | 9/2008 |
| EP | 1538802 A2 | 8/2005 |
| WO | 2005/004428 A1 | 1/2005 |

OTHER PUBLICATIONS

Choi, Y-S., et al. "On Channel Estimation and Detection for Multicarrier Signals in Fast and Selective Rayleigh Fading Channels", IEEE Trans. on Communications, vol. 49, No. 8, pp. 1375-1387 (Aug. 2001).
3GGP, "TR 25.814 V1.2.2—Physical Layer Aspects for Evolved UTRA (Release 7)", 108 pages, (Mar. 2006).
International Search Report and Written Opinion for International Patent Application PCT/CN2008/001420 (May 14, 2009).
European Search report, 08783609.4, Jun. 8, 2012.

* cited by examiner

*Primary Examiner* — Erin File

(57) ABSTRACT

Orthogonal Frequency Division Multiplexing (OFDM) is a typical multi-carrier technique that has been applied by many advanced wireless communication systems, e.g., 3GPP Long Term Evolution (LTE) and WiMAX. In order to support high mobility transmission, the sub-carrier spacing of multi-carrier systems is made large enough to overcome the Doppler frequency offset. However, this large sub-carrier spacing results in lower transmission efficiency since the CP (Cyclic Prefix) consumes a considerable of radio resources. The present invention provides an adaptive scheme to determine the sub-carrier spacing in which the default sub-carrier spacing is set to support lower mobility, while the adaptively adjusted sub-carrier spacing based on User Equipment (UE) mobile velocities is set to support higher mobility.

19 Claims, 3 Drawing Sheets

ADAPTIVE SCHEME TO DETERMINE THE SUB-CARRIER SPACING FOR MULTI-CARRIER SYSTEMS

The present invention relates generally to multi-carrier communication systems and more particularly to an adaptive method for determination of subcarrier spacing therein.

In multi-carrier systems, a symbol duration is increased by splitting the high-rate serial data stream into many low-rate parallel streams. In orthogonal frequency division multiplexing (OFDM), for example, a stream of signals is modulated on many equally spaced parallel subcarriers. Referring to FIG. 1, modulation and demodulation are implemented by means of inverse fast fourier transform (IFFT) 101 and its inverse (FFT) 102, respectively. The orthogonality of the signals, when transmitted over a radio channel, can only be maintained if the channel is flat and time-invariant.

As shown in FIG. 1, the input bits are first grouped and assigned for transmission over different frequencies (sub-carriers). OFDM system is an example of a multi-carrier system in which the frequency domain signals are transformed into a time domain by an IFFT module 101:

$$s(n) = \sqrt{\frac{1}{N}} \sum_{k=0}^{N-1} d_k e^{j2\pi nk/N} \quad (-(N-1) \leq n \leq N-1) \quad \text{Equation 1}$$

On the receiver side the signal is first demodulated and amplified. The result is then treated by a Fast fourier Transformation function which converts the time signal back into the frequency domain. The received signal y(n) can be expressed as:

$$y(n) = \sum_{l=0}^{L} h(n, l)s(n-l) + w(n) \quad \text{Equation 2}$$

Replacing s(n) with Equation 1, Equation 2 can be rewritten as:

$$y(n) = \sqrt{\frac{1}{N}} \sum_{k=0}^{N-1} d_k H_k(n) e^{j2\pi nk/N} + w(n) \quad \text{Equation 3}$$

where $$H_k(n) = \sum_{l=0}^{L} h(n, l) e^{-j2\pi lk/N},$$

The $k^{th}$ sub-carrier output from the FFT module 102 can be expressed as:

$$Y_k = \sqrt{\frac{1}{N}} \sum_{k=0}^{N-1} y(n) e^{-j2\pi nk/N} = d_k H_k + \alpha_k + w_k \quad \text{Equation 4}$$

where $$H_k = \frac{1}{N} \sum_{n=0}^{N-1} H_k(n) \quad \text{Equation 5}$$

$$\alpha_k = \frac{1}{N} \sum_{m=0, m \neq k}^{N-1} d_m \sum_{n=0}^{N-1} H_m(n) \exp[j2\pi n(m-k)/N] \quad \text{Equation 6}$$

$$w_k = \sqrt{\frac{1}{N} \sum_{n=0}^{N-1} w(n) e^{-j2\pi nk/N}} \quad \text{Equation 7}$$

The $d_k H_k$ is the expected received signal and the $a_k$ represents Inter-Carrier Interference (ICI) caused by the time-varying nature of the channel. $w_k$ is white Gaussian noise. Thus, ICI is structured according to the transmit standard.

SC-FDMA is a single-carrier transmission with cyclic prefix to achieve uplink inter-user orthogonality and to enable efficient frequency-domain equalization at the receiver side. Frequency-domain generation of the signal, sometimes known as DFT-spread OFDM, is assumed and illustrated in FIG. 2. In spite of its name, SC-FDMA also transmits data over the air interface in many sub-carriers but adds an additional processing step that spreads the information of beach bit over all sub-carriers. This is accomplished in the following way: a number of bits are grouped together and input into an FFT whose output is the basis for creation of the sub-carriers for the following IFFT. As not all sub-carriers are used by the mobile station, many of them are set to zero. These may or may not be used by other mobile stations.

On the receiver side the signal is demodulated, amplified and treated by the FFT in the same way as in OFDM. The resulting output is fed to the IFFT function to remove the effect of the additional signal processing done at the transmitter side. The result of the IFFT is a time domain signal which is now fed to a single detector block which recreates the original bits. Thus, instead of detecting the bits on many different sub-carriers, only a single detector is used on a single carrier.

Assuming c is the light's velocity, $f_o$ is the accepted unitary frequency offset, v is the User Equipment's (UE's) mobile velocity, $f_s$ is the carrier frequency, $f_d$ is the maximum Doppler frequency offset, $g_f$ is necessary sub-carrier spacing, $f_o$ can be derived by:

$$f_0 = f_d / g_f = \frac{v f_s}{c g_f} \quad \text{Equation 8}$$

Therefore, in order to keep the fixed unitary frequency offset $f_o$, $g_f$ should be aligned with v and $f_s$.

For OFDM systems, the sub-carrier spacing should be large enough to satisfy the mobility requirement. However, a large sub-carrier spacing will reduce the transmission efficiency due to the existence of a cyclic prefix CP.

Moreover, under the same mobility, the sub-carrier spacing varies according to the carrier frequency, which shows a proportional relationship. Therefore, it is difficult to adopt a fixed sub-carrier spacing for a next generation system (IMT-A) since it can be deployed on a carrier frequency ranging from 500 MHz to 4 Ghz.

Therefore, the present invention provides an adaptive scheme to determine the sub-carrier spacing according to the UE's mobile velocity and the carrier frequency.

Other features and advantages of the present invention will become apparent from the following detailed description, taken in conjunction with the accompanying drawings, illustrating by way of example the principles of the present invention.

The fundamental sub-carrier spacing is set according to a low mobility and carrier frequency. For those UEs that required larger sub-carrier spacing (due to higher mobility or carried on a higher carrier frequency), the present invention uses DFT to combine several sub-carriers to form a larger "sub-carrier" that can satisfy the required sub-carrier spacing. In addition, a system according to the present invention monitors the channel parameter variations (based on reference signals) to determine a suitable sub-carrier spacing for one UE.

A method, according to the present invention, for adaptively adjusting sub-carrier spacing is introduced, then the corresponding transceiver architecture is described.

First, the minimum sub-carrier spacing ($g_m$) is determined according to a lower velocity and carrier frequency of one UE.

Then, the system according to the present invention, monitors the UE's velocity via measuring the UE's channel parameter variations. In an exemplary embodiment, this is accomplished by demodulating the adjacent reference signals.

According to the UE's velocity and present carrier frequency, the system, according to an exemplary embodiment, determines the appropriate sub-carrier spacing $g_f$ using Equation 8. For easy implementation, $g_f$ can simultaneously satisfy the condition that the relationship expressed in Equation 8 is a power of 2.

Then both the system and the UE operate on allocated resources with "sub-carrier" spacing $g_f$, which is a "virtualized" sub-carrier spacing via DFT—DFT spread sub-carrier spacing, as described below.

Figure 1:
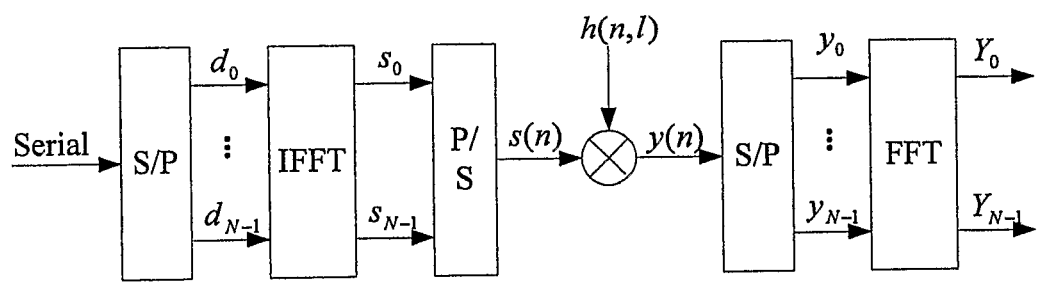
FIG. 1 illustrates a conventional OFDM system model.
Figure 2:
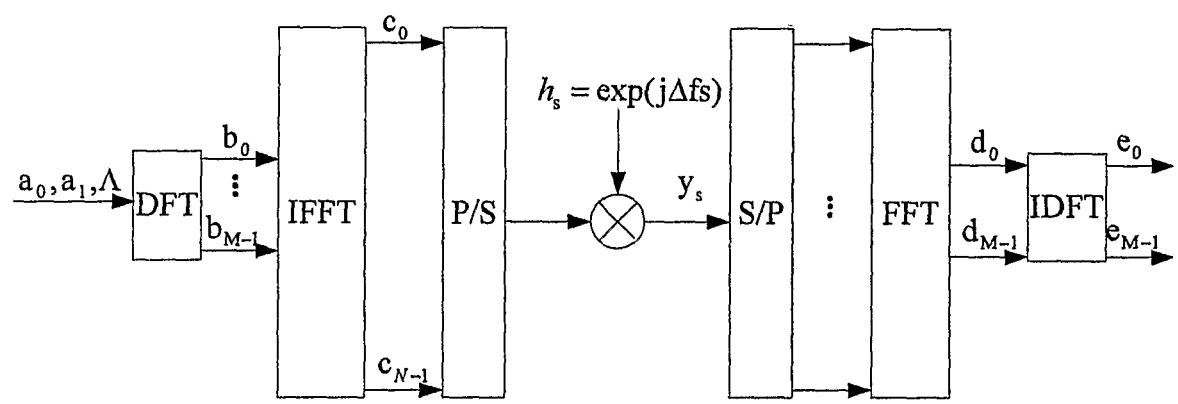
FIG. 2 illustrates a conventional SC-FDMA system model.
Figure 3:
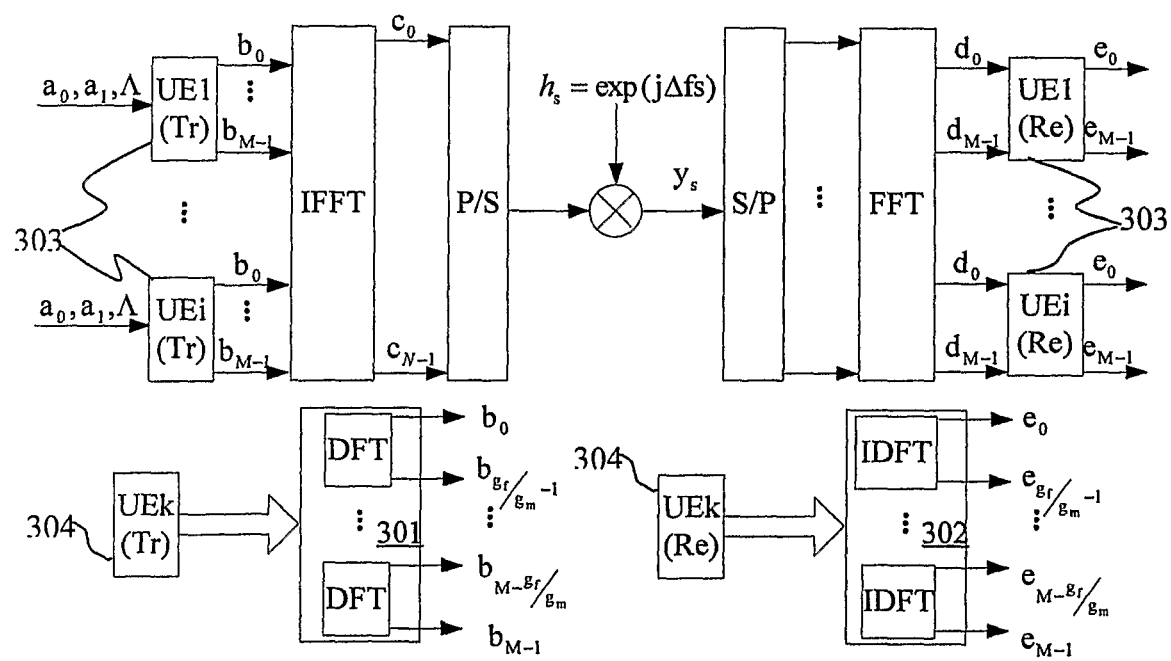
FIG. 3 illustrates an OFDM system, according to an exemplary embodiment of the present invention.

Similar to SC-FDMA, the "virtualized" sub-carrier spacing is achieved via DFT spreading at the transmitter side and an IDFT operation at the receiver side, as shown in FIG. 3.

Compared to SC-FDMA, the unique features of the provided "DFT-spread" sub-carrier spacing schemes include:

One UE 304 employs multiple DFT/IDFT modules 301/302 in one resource block, and the DFT/IDFT size is decided according to the UE's mobile velocity and carrier frequency Multiple UEs 303 in one OFDM symbol can use different sub-carrier spacings according to practical mobile velocities The identified signals in FIG. 3 are described below:

$$b_k = \sqrt{\frac{1}{M}} \sum_{i=0}^{M-1} a_i e^{-j2\pi i k/M} (0 \leq k \leq M-1)$$

$$c_s = \sqrt{\frac{1}{M}} \sum_{k=0}^{N-1} b_k e^{j2\pi k s/N} (0 \leq s \leq N-1)$$

$$y_s = c_s e^{-j\Delta fs} (0 \leq s \leq N-1)$$

$$d_t = \sqrt{\frac{1}{N}} \sum_{k=0}^{N-1} y_s e^{-j2\pi s t/N} (0 \leq s \leq N-1)$$

$$e_1 = \sqrt{\frac{1}{M}} \sum_{t=0}^{M-1} d_t e^{-j2\pi t l/M} (0 \leq k \leq M-1)$$

After simplification, $e_1$ can be described as:

$$e_1 = a_1 e^{j2\pi l \Delta f/M} \quad \text{Equation 9}$$

Equation 9 shows that the frequency offset only results in phase rotation of the transmitted signals, and does not cause inter-signal interference (ISI). Therefore, the present invention can support a higher frequency offset than an "OFDM-only" system.

The proposed scheme can be applied for multi-carrier systems, especially for next generation mobile systems like IMT-A systems.

While exemplary embodiments of the present invention have been provided, one skilled in the art will realize that the invention is not limited to the specific details and exemplary embodiments shown and described herein. Accordingly, various modifications may be made thereto without departing from the spirit or scope of the general inventive concept as defined by the appended claims and their equivalents.

What is claimed is:

1. An adaptive sub-carrier spacing method for a multi-carrier communication system, comprising:
    setting a minimum sub-carrier spacing, $g_m$, to a default sub-carrier spacing that supports a pre-determined low mobility and a deployed carrier frequency for a user equipment (UE);
    monitoring the mobile velocity of the UE;
    determining an appropriate DFT-spread sub-carrier spacing, $g_f$, based on the monitored UE velocity and deployed carrier frequency; and
    achieving the determined DFT-spread sub-carrier spacing via DFT spreading at a transmitter side and an inverse DFT (IDFT) operation at a receiver side of the multi-carrier communication system,
    wherein determining further comprises setting $g_f$ to be equal to k times the minimum sub-carrier spacing, $g_m$, where k is an integer $\geq 1$.

2. The method of claim 1, wherein monitoring further comprises the system acknowledging the UE's velocity by measuring the channel parameter variations.

3. The method of claim 2, wherein measuring further comprises demodulating the reference signals of adjacent symbols to measure the channel parameter variations.

4. The method of claim 1, wherein achieving further comprises making the determined appropriate sub-carrier spacing be proportional to the mobile velocity and carrier frequency of the UE.

5. An adaptive sub-carrier spacing method for a multi-carrier communication system, comprising:
    setting a minimum sub-carrier spacing, $g_m$, to a default sub-carrier spacing that supports a pre-determined low mobility and a deployed carrier frequency for a user equipment (UE);
    monitoring the mobile velocity of the UE;
    determining an appropriate DFT-spread sub-carrier spacing, $g_f$, based on the monitored UE velocity and deployed carrier frequency; and
    achieving the determined DFT-spread sub-carrier spacing via DFT spreading at a transmitter side and an inverse DFT (IDFT) operation at a receiver side of the multi-carrier communication system,
    wherein achieving further comprises making the determined appropriate sub-carrier spacing be proportional to the mobile velocity and carrier frequency of the UE, and
    wherein achieving further comprises making the quotient obtained by calculating $g_f/g_m$ be a power of 2 if the quotient between the mobile velocity of the UE and a pre-determined velocity that corresponds to the pre-determined low mobility for the UE is a power of 2.

6. The method of claim 1, wherein achieving further comprises making the quotient obtained by calculating $g_f/g_m$ be a power of 2 if the quotient between the mobile velocity of the UE and a pre-determined velocity that corresponds to the pre-determined low mobility for the UE is a power of 2.

7. The method of claim 1, achieving further comprises using DFT modules at the transmitter side and IDFT modules at the receiver side to implement the DFT-spread sub-carrier spacing.

8. The method of claim 7, wherein the multi-carrier communication system is an OFDM multi-carrier communication system.

9. The method of claim 4, wherein the multi-carrier communication system is an OFDM multi-carrier communication system.

10. The method of claim 1, wherein the multi-carrier communication system is an OFDM multi-carrier communication system.

11. A system for an adaptive sub-carrier spacing in a multi-carrier communication system, comprising:
    a DFT module that implements the "DFT-spread" sub-carrier spacing via DFT spreading at a transmitter side of the multi-carrier communication system, configured to:
        initially set a minimum sub-carrier spacing, $g_m$, to a default sub-carrier spacing that supports a pre-determined low mobility and a deployed carrier frequency for one user equipment (UE);
        monitor the mobile velocity of the one UE and determine an appropriate DFT-spread sub-carrier spacing, $g_f$, based on the monitored UE velocity and deployed carrier frequency; and
    an IDFT module that implements an inverse DFT-spread operation at a receiver side of the multi-carrier system, wherein the DFT module is further configured to set $g_f$ to be equal to k times the minimum sub-carrier spacing, $g_m$, where k is an integer $\geq 1$.

12. The system of claim 11, wherein DFT module is further configured to acknowledge the one UE's velocity by measuring the channel parameter variations.

13. The system of claim 12, wherein the DFT module is further configured to demodulate the reference signals of adjacent symbols to measure the channel parameter variations.

14. The system of claim 11, wherein the DFT is further configured to set the determined appropriate sub-carrier spacing to be proportional to the mobile velocity and carrier frequency of the one UE.

15. A system for an adaptive sub-carrier spacing in a multi-carrier communication system, comprising:
    a DFT module that implements the "DFT-spread" sub-carrier spacing via DFT spreading at a transmitter side of the multi-carrier communication system, configured to:
        initially set a minimum sub-carrier spacing, $g_m$, to a default sub-carrier spacing that supports a pre-determined low mobility and a deployed carrier frequency for one user equipment (UE);
        monitor the mobile velocity of the one UE and determine an appropriate DFT-spread sub-carrier spacing, $g_f$, based on the monitored UE velocity and deployed carrier frequency; and
    an IDFT module that implements an inverse DFT-spread operation at a receiver side of the multi-carrier system, wherein the DFT is further configured to set the determined appropriate sub-carrier spacing to be proportional to the mobile velocity and carrier frequency of the one UE, and
    wherein the DFT is further configured to set the sub-carrier spacing such that a quotient obtained by dividing $g_f/g_m$ be a power of 2 if the quotient between the mobile velocity of the UE and a pre-determined velocity that corresponds to the pre-determined low mobility for the UE is a power of 2.

16. The system of claim 11, wherein the DFT is further configured to set the sub-carrier spacing such that a quotient obtained by dividing $g_f/g_m$ be a power of 2 if the quotient between the mobile velocity of the UE and a pre-determined velocity that corresponds to the pre-determined low mobility for the UE is a power of 2.

17. The system of claim 16, wherein the multi-carrier communication system is an OFDM multi-carrier communication system.

18. The system of claim 15, wherein the multi-carrier communication system is an OFDM multi-carrier communication system.

19. The system of claim 11, wherein the multi-carrier communication system is an OFDM multi-carrier communication system.

* * * * *